United States Patent
Wallingsford

(10) Patent No.: US 6,390,488 B1
(45) Date of Patent: May 21, 2002

(54) IMPACT AND SHOCK ABSORBING MOTORCYCLE FOOT PEG

(76) Inventor: Brent Wallingsford, 1430 San Clemente Cir., Corona, CA (US) 91720

(*) Notice: Subject to any disclaimer, the term of this patent is extended or adjusted under 35 U.S.C. 154(b) by 0 days.

(21) Appl. No.: 09/519,626

(22) Filed: Mar. 6, 2000

(51) Int. Cl.[7] .............................................. B62J 25/00
(52) U.S. Cl. ..................... 280/291; 74/564; 296/75; 297/423.42
(58) Field of Search .............................. 180/219, 90.6; 280/291, 166, 163; 74/564, 563, 594.4, 560; 296/75; 224/423, 413; 293/105, 106; D12/186; 297/423.42, 423.19

(56) References Cited

U.S. PATENT DOCUMENTS

| | | | |
|---|---|---|---|
| 2,270,902 A | * | 1/1942 | Rubissow |
| 2,910,888 A | * | 11/1959 | Bergsten |
| 3,287,992 A | * | 11/1966 | Smith |
| 4,591,179 A | * | 5/1986 | Nakamura ................. 280/291 |
| 4,726,438 A | | 2/1988 | Stuertz et al. |
| 5,449,332 A | * | 9/1995 | Hervig ....................... 74/594.4 |
| 5,454,580 A | * | 10/1995 | Lin ............................ 280/291 |
| 5,638,723 A | * | 6/1997 | Lin ............................. 74/564 |
| 5,673,597 A | * | 10/1997 | Lin ............................. 74/563 |
| 5,738,180 A | | 4/1998 | Hofmann et al. |
| 5,893,424 A | | 4/1999 | Hisada |
| 6,161,859 A | * | 12/2000 | Cheng ....................... 280/291 |

FOREIGN PATENT DOCUMENTS

| | | | | |
|---|---|---|---|---|
| FR | 641497 | * | 8/1928 | ................. 280/291 |
| GB | 139924 | * | 3/1920 | ................. 280/291 |

* cited by examiner

Primary Examiner—Anne Marie Boehler
(74) Attorney, Agent, or Firm—Charles H. Thomas

(57) ABSTRACT

A motorcycle foot peg is constructed to absorb shocks and impacts that would otherwise be transmitted to a rider's foot during hard landings of a motorcycle. The impact and shock absorbing motorcycle foot peg has particular applicability to off-road motorcycles. The foot peg has a rigid mounting platform including a mounting plate from which a rigid foot support projects outwardly in cantilevered fashion. The foot support has a flat upper bearing surface and supports a foot pad formed of a resiliently compressible elastomeric material having a Shore A hardness of between about 30 and 60. A foot contact plate is located atop the elastomeric slab. The foot contact plate, the elastomeric slab, and foot support are connected together by bolts passing therethrough. The foot contact plate thereby resides in a floating relationship relative to the foot support and can move both toward the foot support and laterally relative to the foot support to cushion the rider's foot against shocks and impacts. Spacer washers may be provided about the shanks of the bolts to adjust a preload compression on the resilient pad.

11 Claims, 4 Drawing Sheets

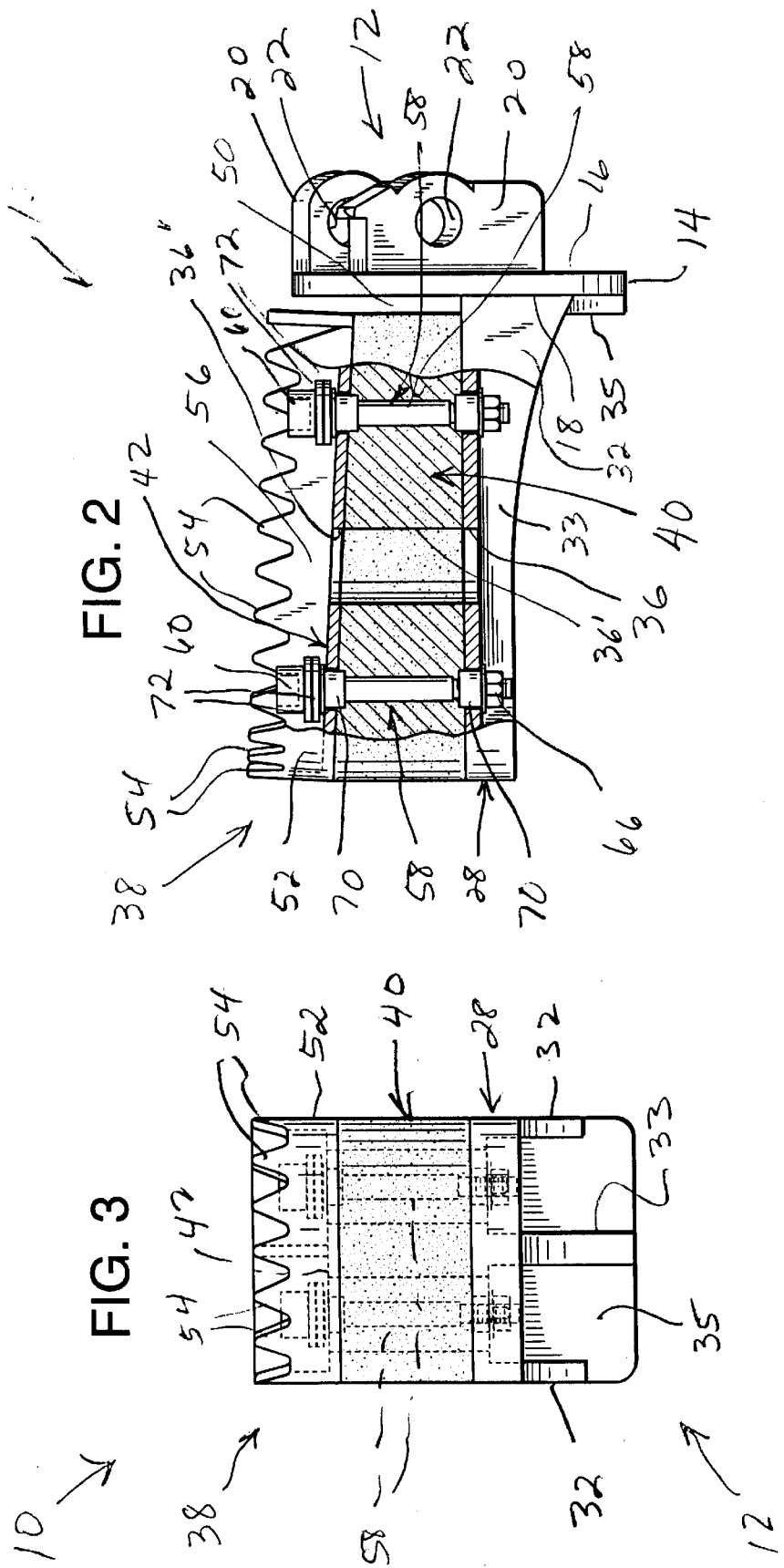

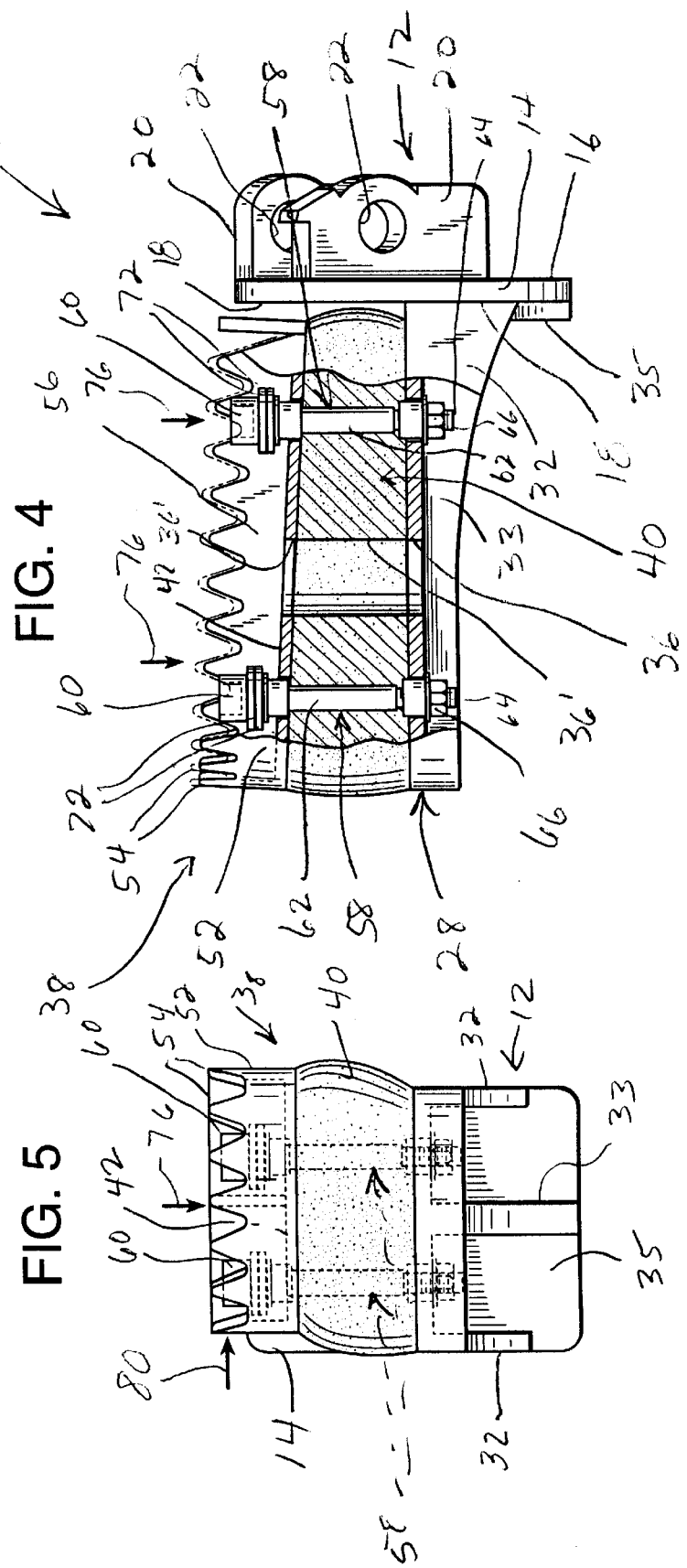

IMPACT AND SHOCK ABSORBING MOTORCYCLE FOOT PEG

BACKGROUND OF THE INVENTION

1. Field of the Invention

The present invention relates to an improved motorcycle foot peg and is particularly effective for use on off-road dirt racing motorcycles such as Motocross and Supercross motorcycles.

2. Description of the Prior Art

Conventional motorcycles are typically equipped with foot pegs to support a rider's feet while the motorcycle is traveling. A conventional foot peg is formed as a steel rod or a flat steel platform that projects laterally outwardly from the motorcycle frame. Separate foot pegs are mounted upon each side of the motorcycle and are normally connected to the motorcycle frame by hinge connections. The foot pegs may thereby be folded up against the frame at a forty-five degree angle if contact is made with a solid object or if the motorcycle is laid down or falls to the ground on its side. The foot pegs are normally deployed in cantilevered positions projecting straight out from the motorcycle frame while the motorcycle is traveling. The rider then rests his or her feet upon the foot pegs. The foot pegs thereby serve as foot supports for the rider's feet while traveling.

While existing motorcycle foot pegs do provide support for a rider's feet while the motorcycle travels, conventional foot pegs can and do cause injuries. These injuries frequently result when the rider makes a hard landing. The shocks and impacts of such landings often cause severe bruises to a rider's feet. Also, fractures to the bones of a rider's foot and ankle sometimes result from hard landings due to the great forces transmitted to the rider's feet through conventional motorcycle foot pegs. Such injuries are particularly prevalent among riders who operate off-road dirt racing motorcycles.

SUMMARY OF THE INVENTION

The present invention provides an improved motorcycle foot peg which reduces the occurrence of injuries, particularly foot and ankle injuries that occur when landing hard off of jumps on a motorcycle. Also, the improved motorcycle foot peg of the invention reduces rider fatigue.

The construction of a motorcycle foot peg of the present invention differs from the construction of conventional motorcycle foot pegs in that a resilient, elastic cushion is interposed between the riders foot and the rigid structure that provides underlying foot support. The motorcycle impact and shock absorbing foot peg of the invention is designed primarily for use on off-road dirt motorcycles. By using thermoplastic elastomer cushions between the floating, upper foot contact plates and the lower rigid platform supports projecting out from the frame of the motorcycle, shocks and impacts transmitted from the wheels of the motorcycle to the feet and ankles of the rider are greatly attenuated. The elastomeric cushion allows the upper foot contact plate to move both downwardly and laterally relative to the rigid platform support.

The improved motorcycle foot peg of the invention also provides for better body positioning by the rider when the rider stands up on the foot pegs. The upper portion of the improved foot peg will move slightly left or right and forward or backward to provide better balance and more effective control of the motorcycle. However, the resilient cushion is not so soft as to cause a loss of balance.

In one broad aspect the present invention is an impact absorbent foot peg for a motorcycle comprising: a rigid lower platform secured so as to project in a cantilevered fashion laterally outwardly from a motorcycle frame, and a resiliently compressible foot pad disposed atop the platform. Preferably the platform includes a mounting plate with inboard and outboard sides, a hinged connector on the inboard side of the mounting plate, and a rigid foot support projecting from the outboard side of the mounting plate. The compressible foot pad preferably includes a cushioning slab formed of an elastomeric material disposed atop the rigid foot support, and a rigid foot contact plate disposed atop the slab.

In another broad aspect the invention may be considered to be a combination of a motorcycle having a frame and an impact and shock absorbing motorcycle foot peg comprising a rigid, lower platform having an inboard end attached to the motorcycle frame and a cantilevered outboard end, and a resiliently compressible foot pad secured atop the cantilevered outboard end of the rigid lower platform.

In still another aspect the invention may be considered to be an impact and shock absorbing motorcycle foot peg comprising: a rigid platform having a flat mounting plate with inner and outer surfaces and with a hinge connection projecting from the inner surface and a rigid foot support rigidly joined to the mounting plate and projecting from its outer surface. The rigid foot support has a flat, upper bearing surface oriented perpendicular to the outer surface of the mounting plate. The invention further includes a foot pad having a cushioning slab of resiliently compressible material located atop the flat upper bearing surface of the foot support and a foot contact plate located atop the slab. Preferably, the cushioning pad is formed of a thermoplastic elastomer having a Shore A hardness of between about 30 and about 60.

The invention may be described with greater clarity and particularity by reference to the accompanying drawings.

DESCRIPTION OF THE DRAWINGS

FIG. 2 is a front elevational view of the motorcycle foot peg of FIG. 1, partially broken away to illustrate the interior structure thereof.

FIG. 3 is an end elevational view of the motorcycle foot peg shown in FIG. 2.

FIG. 4 is a front elevational view of the motorcycle foot peg as shown in FIG. 2 in an elastically deformed condition during an impact.

FIG. 5 is an end elevational view showing the motorcycle foot peg during deformation.

DESCRIPTION OF THE EMBODIMENT

Figure 1:
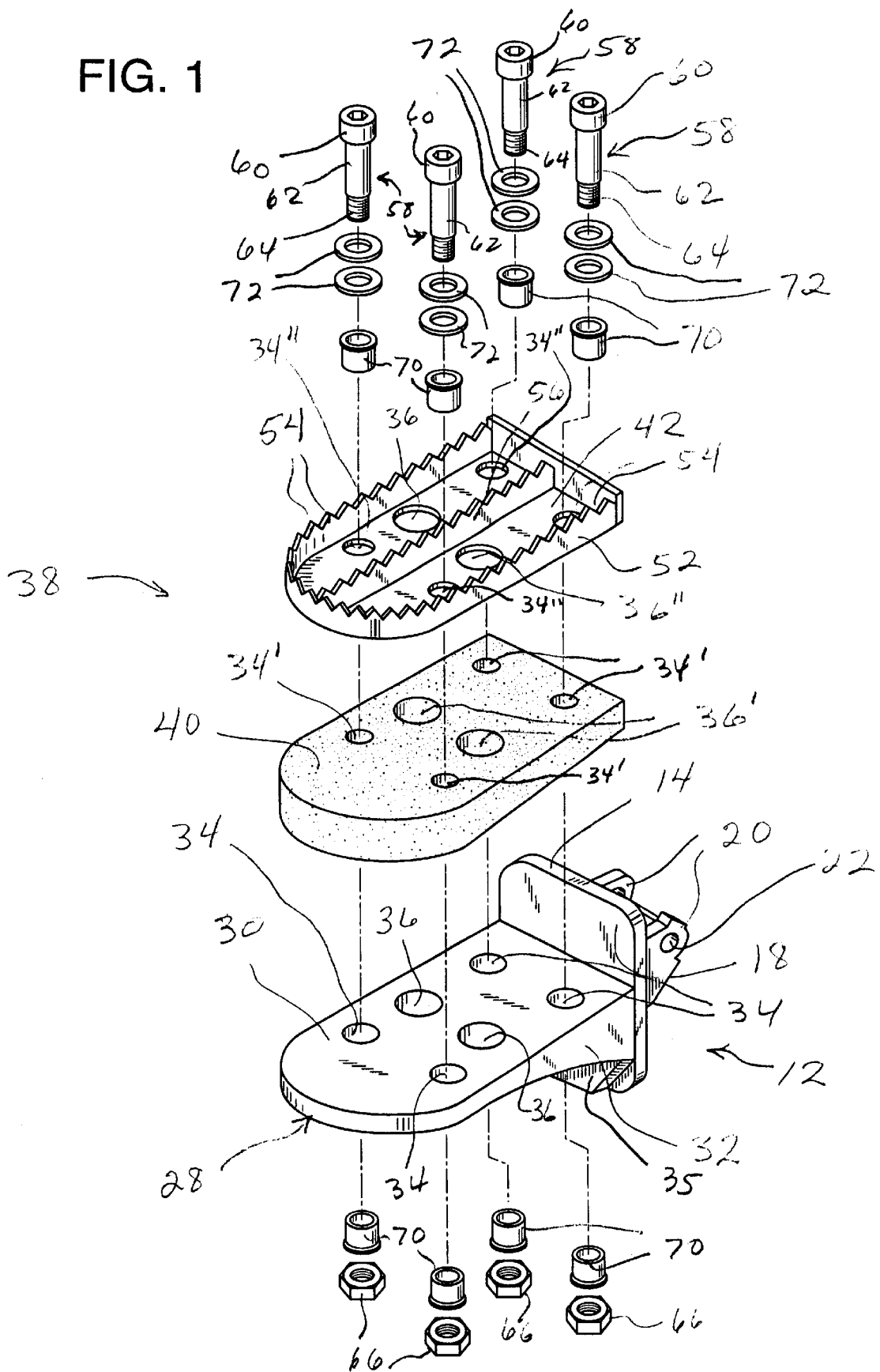
FIG. 1 is an exploded perspective view illustrating one preferred embodiment of the motorcycle foot peg of the invention.
Figure 6:
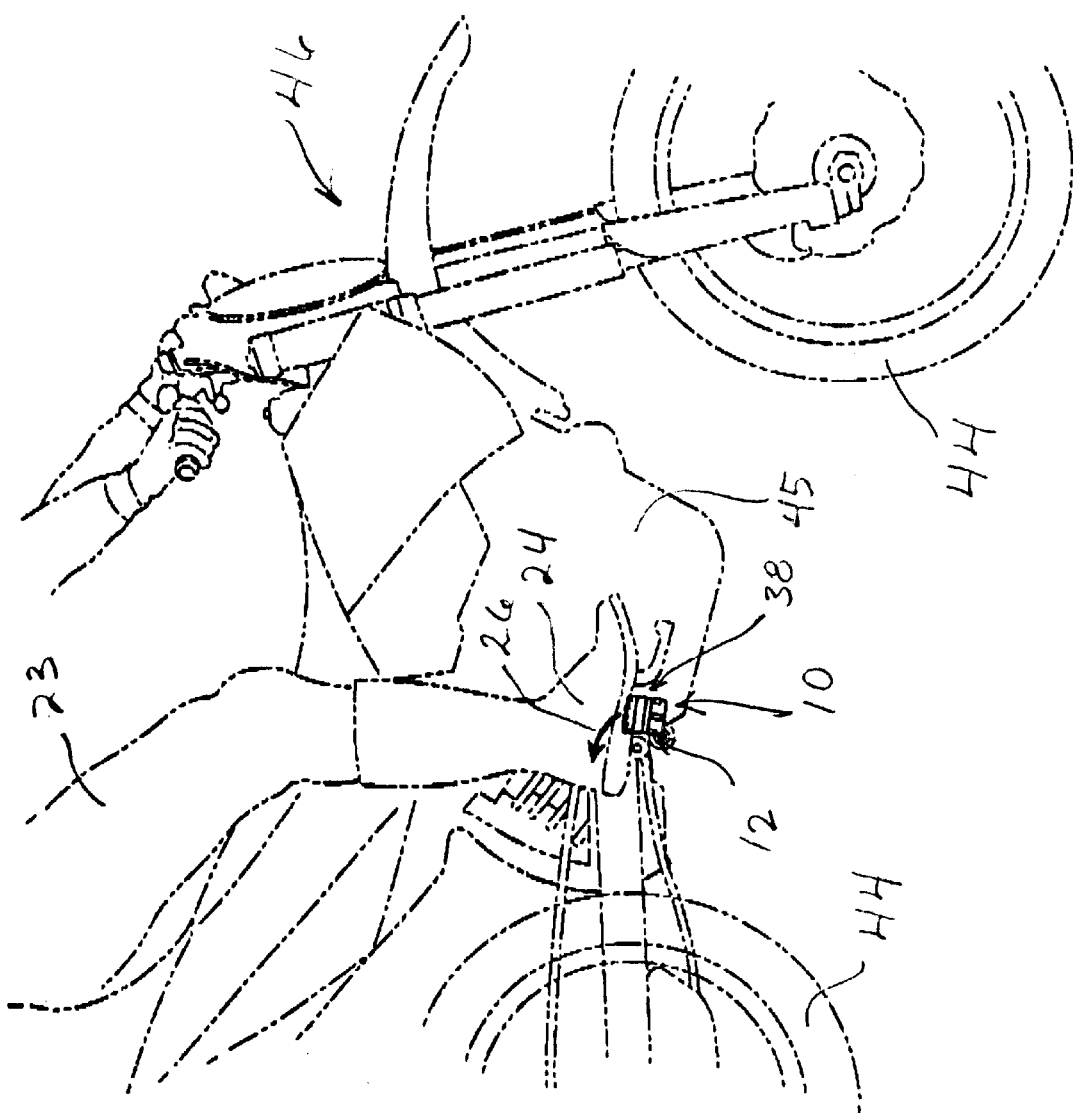
FIG. 6 is a side elevational view illustrating the mounting and use of the motorcycle foot peg of the invention by a rider on a motorcycle.

FIG. 1 illustrates the component parts of a preferred embodiment of an impact and shock absorbing motorcycle foot peg 10 according to the invention. The motorcycle foot peg 10 is comprised of a rigid platform 12 having a flat mounting plate 14 with an inner surface 16, visible in FIG. 2, and an outer surface 18. The mounting plate 14 has a hinge connection formed by a pair of ears 20 with hinge apertures 22 defined therethrough. The mounting ears 20 are oriented at a forty-five degree angle relative to vertical for rotation about a conventional motorcycle foot peg hinge pin mounting rod (not shown) that is anchored to the frame 45 of a motorcycle 46, shown in FIG. 6. This mounting arrangement is conventional and resists a force tending to flip the motorcycle peg 10 upwardly and rearwardly in a direction indicated by the directional arrow 26 in FIG. 6.

The rigid lower platform 12 has a rigid foot support 28 that projects out from the outer surface 18 of the mounting plate 14 in cantilevered fashion. The rigid foot support 28 has a flat, generally U-shaped upper bearing surface 30 and side bracing walls 32 that are thickest at the junction between the foot support 28 and the mounting plate 14 to which the foot support 28 is welded. The foot support 28 also has a central reinforcing bracing web 33 that is parallel to and equidistant from the side bracing walls 32, as shown in FIG. 3. The inboard ends of the side bracing walls 32 and the intermediate web 23 terminate at a transverse backing plate 35, which is welded to the lower portion of the outer surface 18 of the mounting plate 14.

The flat upper bearing surface 30 of the rigid foot support 28 is oriented perpendicular to the outer surface 18 of the mounting plate 14. Four different bolt holes 34, each having a diameter of about three-eighths of an inch are defined through the structure of the foot support 28. Two different larger drain openings 36, each about nine-sixteenths of an inch in diameter, are defined through the structure of the foot support 28 between the inner and outer sets of bolt holes 34.

The motorcycle foot peg 10 is also comprised of a foot pad 38 having a cushioning slab 40 formed of a resiliently compressible thermoplastic elastomer material. The cushioning slab 40 is located atop the flat upper bearing surface 30 of the rigid platform 12. The foot pad 38 also includes a foot contact plate 42 located atop the slab 40.

As best illustrated in FIG. 2, the upright, generally vertically oriented mounting plate 14 is located at the inboard end of the lower foot support platform 12 while the foot support plate 28 is located at the outboard end of the foot support platform 12. As shown in FIG. 2, the cushioning slab 40 has a tapered thickness that increases with distance from the mounting plate 14. The tapering of the cushioning slab 40 so that it is thickest at its extreme outboard extremity aids in preventing the foot 24 of the rider 23 from slipping laterally in an outboard direction and off of the motorcycle foot peg 10 as the tires 44 impact the ground when the motorcycle 46 executes a hard landing. The extent of tapering thickness of the cushioning slab 40 will vary depending upon the material of which the slab 40 is constructed, the size of the foot peg 10, and other variables. However, the taper will typically be no more than about five degrees.

Like the foot support 28, the cushioning slab 40 has four bolt holes 34' and two larger drain openings 36' defined therethrough. The cushioning slab 40 is positioned atop the foot support 28 so that the bolt holes 34 and 34' are coaxially aligned with each other and the apertures 36 and 36' are coaxially aligned with each other. The cushioning slab 40 is positioned atop the foot support 28 so that an expansion gap 50, about one-eighth of any inch in width, is defined between the inboard end of the cushioning slab 40 and the outer or outboard surface 18 of the mounting plate 14.

The foot contact plate 42 has a flat interior portion and a generally U-shaped periphery 52 that is turned upwardly and upon which serrated traction-enhancing teeth 54 are defined. The foot contact plate 42 is further provided with an upwardly projecting rib 56. The rib 56 also has a plurality of upwardly projecting traction-enhancing teeth 54 defined thereon. The serrated rib 56 bisects the interior portion of the foot contact plate 42 and extends outwardly away from the mounting plate 14 in perpendicular orientation relative thereto. The upwardly projecting rib 56 may be formed of a narrow strip of steel welded to the flat upper surface of the foot contact plate 42.

Bolt holes 34" and larger drain apertures 36" are also defined through the flat structure of the interior portion of the foot contact plate 42. The bolt holes 34" and the drain apertures 36" are respectively coaxially aligned with the corresponding bolt holes 34' and 34 and the apertures 36' and 36 defined through the cushioning slab 40 and the foot support 28, respectively. Coaxially aligned drain openings and coaxially aligned bolt holes are thereby defined through the foot support 28, the cushioning slab 40, and the foot contact plate 42. The coaxial alignment of the apertures 36", 36', and 36 through the foot contact plate 42, the cushioning slab 40, and the foot support 28 provide a path for mud to drop from the foot peg 10 so that a buildup of mud upon the foot contact plate 42 is avoided.

The cushioning slab 40 and the foot contact plate 42 are attached to the cantilevered foot support 28 by means of four machine bolts 58. Each machine bolt 58 has a head 60 and a shank 62 having an externally threaded distal tip 64. The shanks 62 of the bolts 58 project through the coaxially aligned bolt holes 34", 34', and 34 in the flat interior portion of the foot contact plate 42, the cushioning slab 40, and the foot support 28. The foot contact plate 42, the cushioning slab 40, and the foot support plate 28 are held together by means of steel lock nuts 66 which are internally tapped and which are preferably internally lined with nylon.

Preferably, the bolt holes 34" through the foot contact plate 42 and the coaxially aligned bolt holes 34 through the foot support 28 are all lined with flanged nylon sleeves 70. The barrel portions of the nylon sleeves 70 are interposed between the surfaces of the bolt shanks 62 and the structures of the foot contact plate 42 and foot support 28 surrounding the bolt holes 34" and 34 therethrough.

The bolts 58 may be provided with flat, annular steel spacer washers 72 which are disposed about their shanks 62 adjacent either the bolt heads 60 or the nuts 66. The number and thickness of the spacer washers 72 is chosen to selectively adjust the amount of a preload compression that may be exerted on the resilient slab 40 by the bolts 58. The shanks 62 of the bolts 58 pass completely through both the foot support 28 and the foot contact plate 42. The nylon sleeves 70 are interposed between the bolt shanks 62 and both the foot support 28 and the foot contact plate 42. By tightening the nuts 66 onto the threaded tips 64 of the bolt shanks 62, the bolts 58 can be preloaded in tension to partially compress the cushioning slab 40 with a selected force of preload compression. The extent of compressive preload may be adjusted by the addition or removal of spacer washers 72. That is, to increase the preload compression on the cushioning slab 40 a greater number of spacer washers 72 are utilized. To reduce the preload compression on the cushioning slab 40, one or more spacer washers 72 may be removed from each bolt 58. The preload compression determines the extent to which the cushioning slab 40 will resiliently deform upon the application of a given impact force.

The effect of an impact or shock transmitted by the motorcycle wheels 44 to the foot peg 10 is best illustrated in FIGS. 4 and 5. During a hard landing in which the motorcycle wheels 44 strike the ground, some of the shock is absorbed into the motorcycle shock absorbers. However, a considerable amount of the shock and impact will be transmitted through the motorcycle frame 45 to the rigid platforms 12 of the motorcycle foot pegs 10. With conventional motorcycle foot pegs, this large shock and impact is transmitted directly to the feet 24 of the motorcycle rider 23. However, with the improved motorcycle foot pegs 10 according to the invention, a large amount of the impact energy is absorbed in the cushioning slabs 40.

An impact to the motorcycle wheels 44 will result in a compressive force being applied to the foot contact plate 42 by the feet 24 of the motorcycle rider. The compressive force 76 will act with a large vertical component, as indicated by the directional arrows 76 in FIGS. 4 and 5, to compress the cushioning slab 40 between the rigid foot support 28 and the rigid foot contact plate 42 which is located atop the cushioning slab 40. This compressive force temporarily and resiliently reduces the thickness of the compressible slab 40 and causes the sides of the compressible slab 40 to bulge outwardly as illustrated in FIGS. 4 and 5. The gap 50 that is defined between the mounting plate 14 and the inboard edge of the compressible slab 40 permits this inboard expansion of the slab 40.

In many impact situations there is a very substantial horizontal component of force, indicated at 80 in FIG. 5, which occurs as a result of an impact of the motorcycle wheels 44 against the ground. The improved motorcycle foot peg 10 of the invention cushions this lateral component of force 80, as well as the vertical force component 76.

As illustrated in FIG. 5, the application of a lateral component of force 80 resulting from an impact will cause the foot contact plate 42 to shift laterally relative to the underlying foot support 28. The foot contact plate 42 is mounted in a floating relationship atop the cushioning slab 40 relative to the foot support 28. The temporary and resilient lateral deformation of the cushioning slab 40 allows the foot contact plate 42 to move laterally relative to the foot support 28 due to the resiliency of the nylon sleeves 70 and due to the resilient construction of the cushioning slab 40. As a result, the foot contact plate 42 temporarily moves in lateral translation relative to the foot support 28, as illustrated in FIG. 5. As a consequence, the motorcycle foot peg 10 of the invention absorbs lateral force components 80, as well as a vertical force components 76 that would otherwise be transmitted to the rider's foot 24.

Undoubtedly, numerous variations and modifications of the invention will become readily apparent to those familiar with motorcycle construction and safety features. For example, a subassembly containing coil springs or leaf springs could be substituted for the resilient, elastomeric slab 40. In another embodiment the pad could be the same thickness throughout, but formed of a two-piece elastomer. That is, the outboard section of the pad could be formed of a heavier elastomer than the inboard portion. This would result in greater resilient deformation at the inboard end of the foot peg than at the outboard end, which would tend to prevent the rider's foot 24 from slipping laterally off the foot peg. Also, the foot contact plate 42 and the foot support 28 can have a wide variety of configurations and still operate according to the invention.

Accordingly, the scope of the invention should not be construed as limited to this specific embodiment depicted and described herein, but rather is defined in the claims appended hereto.

I claim:

1. An impact absorbing foot peg for a motorcycle comprising: a rigid lower platform secured so as to project in a cantilevered fashion laterally outwardly from a motorcycle frame and which includes a mounting plate with inboard and outboard sides, a hinged connector on said inboard side of said mounting plate, and a rigid foot support projecting from said outboard side of said mounting plate, a resiliently compressible foot pad that includes a cushioning slab formed of an elastomeric material disposed atop said rigid foot support, and a rigid foot contact plate disposed atop said slab, and a plurality of bolts joining said foot contact plate to said foot support and passing through said slab, and said bolts are preloaded in tension to partially compress said slab with a selected force of preload compression.

2. A foot peg according to claim 1 further comprising a selected number of spacer washers disposed about said bolts to selectively adjust said preload compression.

3. A foot peg according to claim 1 further characterized in that said bolts have shanks that pass completely through both said foot support and said foot contact plate and further comprising nylon sleeves interposed between said bolt shanks and both said foot support and said foot contact plate.

4. An impact absorbing foot peg for a motorcycle comprising: a rigid lower platform secured so as to project in a cantilevered fashion laterally outwardly from a motorcycle frame and which includes a mounting plate with inboard and outboard sides, a hinged connector on said inboard side of said mounting plate, and a rigid foot support projecting from said outboard side of said mounting plate, a resiliently compressible foot pad that includes a cushioning slab formed of an elastomeric material disposed atop said rigid foot support, wherein said cushioning slab has a tapered thickness that increases with distance from said mounting plate, and a rigid foot contact plate disposed atop said slab.

5. An impact absorbing foot peg for a motorcycle comprising: a rigid lower platform secured so as to project in a cantilevered fashion laterally outwardly from a motorcycle frame and which includes a mounting plate with inboard and outboard sides, a hinged connector on said inboard side of said mounting plate, and a rigid foot support projecting from said outboard side of said mounting plate, a resiliently compressible foot pad that includes a cushioning slab formed of an elastomeric material disposed atop said rigid foot support, and a rigid foot contact plate disposed atop said slab, wherein said foot contact plate has a flat interior portion and a periphery that projects upwardly and upon which traction enhancing teeth are defined, and further comprising an upwardly projecting rib located atop said interior portion of said foot contact plate, and said the rib bisects said interior portion of said foot contact plate and extends outwardly away from said mounting plate in perpendicular orientation relative thereto.

6. An impact absorbing foot peg for a motorcycle comprising: a rigid lower platform secured so as to project in a cantilevered fashion laterally outwardly from a motorcycle frame and which includes a mounting plate with inboard and outboard sides, a hinged connector on said inboard side of said mounting plate, and a rigid foot support projecting from said outboard side of said mounting plate, a resiliently compressible foot pad that includes a cushioning slab formed of an elastomeric material disposed atop said rigid foot support, and a rigid foot contact plate disposed atop said slab, wherein coaxially aligned drain openings are defined through said foot support, said cushioning slab, and said foot contact plate.

7. An impact absorbing foot peg for a motorcycle comprising: a rigid lower platform secured so as to project in a cantilevered fashion laterally outwardly from a motorcycle frame and which includes a mounting plate with inboard and outboard sides, a hinged connector on said inboard side of said mounting plate, and a rigid foot support projecting from said outboard side of said mounting plate, a resiliently compressible foot pad that includes a cushioning slab formed of an elastomeric material disposed atop said rigid foot support, and a rigid foot contact plate disposed atop said slab, and wherein a lateral expansion gap is defined between said cushioning slab and said mounting plate and between said foot contact plate and said mounting plate.

8. In combination, a motorcycle having a frame and an impact and shock absorbing motorcycle foot peg comprising a rigid, lower platform having an inboard end attached to said motorcycle frame and a cantilevered outboard end, a resiliently compressible foot pad secured atop said cantilevered outboard end of said rigid, lower platform, wherein said foot pad is comprised of a cushioning slab of resiliently compressible elastomeric material located atop said lower platform, and a rigid foot contact plate located atop said cushioning slab and supported in floating relationship above said lower platform, and a plurality of preloading bolts that join said foot contact plate to said platform and which have shanks that extend through said cushioning slab.

9. A combination according to claim 8 further comprising a selected number of spacing washers disposed about each bolt shank to establish a selected compressive preload on said cushioning slab.

10. In combination, a motorcycle having a frame and an impact and shock absorbing motorcycle foot peg comprising a rigid, lower platform having an inboard end attached to said motorcycle frame and a cantilevered outboard end, a resiliently compressible foot pad secured atop said cantilevered outboard end of said rigid, lower platform, wherein said foot pad is comprised of a cushioning slab of resiliently compressible elastomeric material located atop said lower platform, and a rigid foot contact plate located atop said cushioning slab and supported in floating relationship above said lower platform, and wherein said lower platform is comprised of a mounting plate at its inboard end and a foot support plate at its outboard end and said cushioning slab has a tapered thickness that increases with distance from said mounting plate.

11. A combination according to claim 10 wherein an expansion gap is defined between said mounting plate and said cushioning slab and between said mounting plate and said foot contact plate.

\* \* \* \* \*